Oct. 8, 1957      T. HUERTH      2,808,835

STRAW SPREADER FOR STRAW RACK

Filed Sept. 20, 1955      2 Sheets-Sheet 1

INVENTOR.
THEODORE HUERTH
BY *Joseph G. Werner*
ATTORNEY.

INVENTOR.
THEODORE HUERTH
BY Joseph G. Herner
ATTORNEY.

United States Patent Office 2,808,835
Patented Oct. 8, 1957

2,808,835

STRAW SPREADER FOR STRAW RACK

Theodore Huerth, Sauk City, Wis.

Application September 20, 1955, Serial No. 535,457

5 Claims. (Cl. 130—27)

This invention relates to threshing or harvesting machines and is concerned particularly with devices for facilitating the separation of grain from straw and weeds in the separator housing whereby to enable the recovery of a maximum quantity of grain.

Various baffle means and the like have heretofore been provided in efforts to increase grain recovery but have not been particularly efficient especially in areas where there are weeds and rather hilly fields or when crops are down after a storm or heavy wind. Such prior devices have also been particularly inefficient when the harvester is at an angle on a hill permitting the straw and grain to become compacted in the lower corner of the separator housing.

It is the principal object of the present invention to overcome the foregoing and other disadvantages of prior devices and to provide improved means for effectively separating grain or seeds from straw and weeds under all conditions of use.

A further object of the invention is to provide grain saving means which serves the adidtional function of equally distributing the separated straw and weeds over the surface of the straw rack and which is also constructed and arranged to turn over such straw and weeds as they are deposited upon the straw rack.

Still another object of the invention is to provide a grain saving device which may be in the form of an attachment for use in connection with existing threshing machines.

Other objects and advantages of the invention will be apparent from the following detailed description taken in conjunction with the accompanying drawings wherein a preferred embodiment of the principles of the invention has been selected for exemplification.

Figure 1:
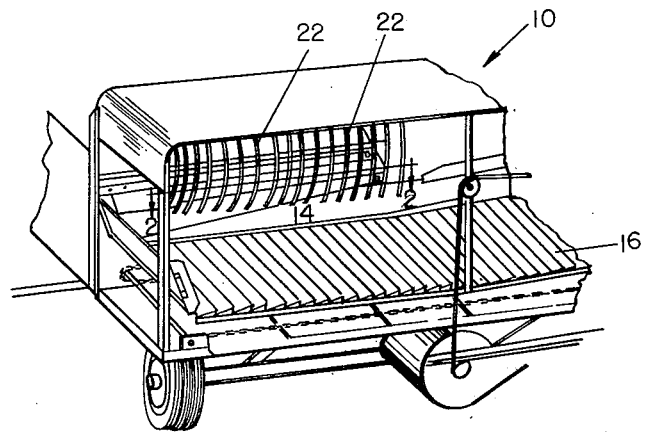
Fig. 1 is a perspective view taken from the rear of a harvester or threshing machine showing the device of my invention installed in the separator housing thereof, the remainder of the machine not being illustrated since it forms no part of the present invention.

Referring more particularly to the drawings, wherein like numerals refer to like parts, the harvester or threshing machine, indicated in its entirety at 10, may be of any conventional character but preferably is of the Allis-Chalmers type wherein a rotating cylinder 12 is provided usually rotating in the range of 450 to 1600 R. P. M.'s to shell the cut material after it leaves the header thereafter to blow the threshed material at an angle upwardly toward the top of the separator housing 14. 16 represents the usual oscillating straw rack which may be provided with fishbacks 18 and beneath the straw rack is the usual grain drag floor (not shown).

Coming now to the structural features of the present invention, a guide plate or baffle 20 is secured to the separator housing wall at a point just above the opening to the cylinder 12 through which the threshed material enters. As shown, the shield member 20 extends upwardly and then curves laterally under and substantially parallel to the roof of the separator housing. The free end portion of the guide member 20 has suitably secured thereto the cross bar 21 of a fork member composed of a plurality of prongs 22 which extend for substantially the width of the cylinder 12 and substantially across the path of the incoming threshed material. The prongs or rods 22, as shown, extend downwardly and are arcuately bowed outwardly of the path of the incoming threshed material. As will be apparent from Fig. 4, the curvature of the prongs 22 is such that as the straw rides along their lengths it is turned over or reversed from its entering position as it leaves the prongs 22 and is deposited upon the surface of the straw racks 16. The greater quantity of grain of course passes through the interstices between the prongs 22 and falls downwardly to the grain drag floor. The minor quantity of grain not thus recovered will be recovered from the separated straw as it is shaken and fluffed by the oscillating straw rack 16 during its passage to the separator housing outlet.

Figure 2:
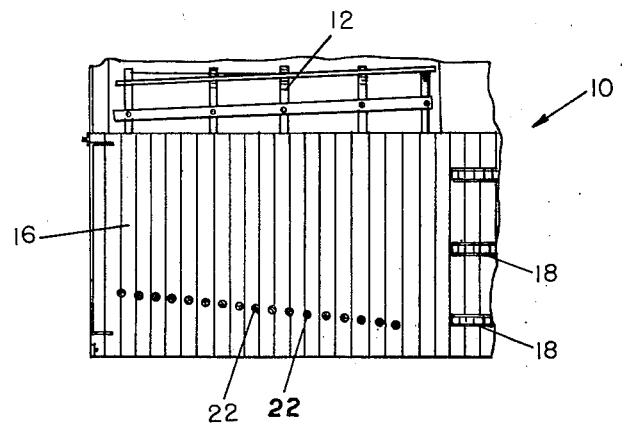
Fig. 2 is a horizontal sectional view taken on the line 2—2 of Fig. 1 and looking in the direction of the arrows.
Figure 3:
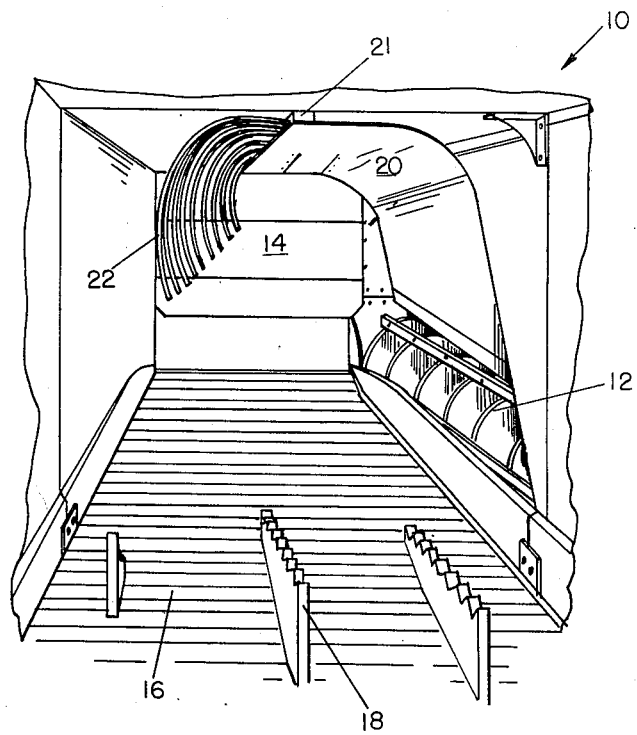
Fig. 3 is a side elevational view of the separator housing as shown in Figs. 1 and 2 looking from the outlet end thereof along the straw rack and Fig. 4 is a schematic view illustrating by the arrows the manner in which the device of the invention separates grain and distributes straw and weeds upon the straw rack.
Figure 4:
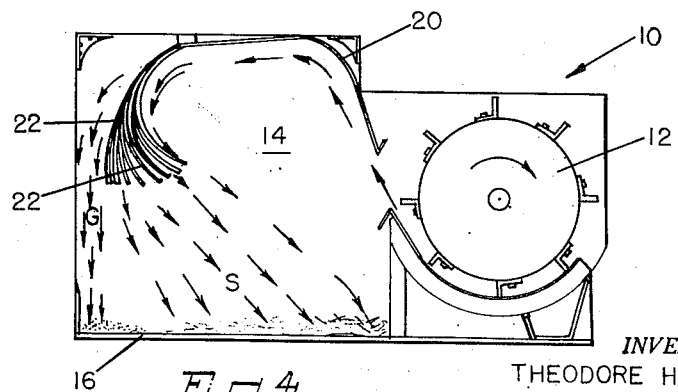

In the preferred form of the invention, the prongs 22 may terminate in substantially the same plane and are of variable curvature increasing from the outlet end of the separator housing toward the rear thereof in such a manner that the straw and weeds striking the central and rearward prongs of greater curvature are thrown toward the central and remote side of the straw rack while the straw and weeds striking the forward prongs of lesser curvature are dropped on the near side of the straw rack. Thus, the particular arrangement of the prongs 22 causes a more or less even distribution of the straw and weeds over the surface of the straw rack more effectively to shake out entrained grain and to drop the same to the grain drag floor. The action of the prong or rod arrangement of the invention is illustrated in Fig. 4 wherein the left hand arrows G indicate the grain which has passed through the spaced prongs 22 and the arrow S indicate the distribution of the straw and weeds evenly over the surface of the straw rack 16 as the result of the selectively varied radius of curvature of the prongs 22. As shown in Fig. 2, the curvature of the prongs may decrease progressively toward the outlet side of the separator housing and in one preferred embodiment of the invention the bottom end of the outermost prong may be spaced approximately five inches from the adjacent housing side wall and the bottom end of the innermost prong spaced a distance of approximately eight inches.

The prongs or bars 22, as shown, preferably are cylindrical or rounded so that grain may readily pass over the surfaces thereof and through the inbetween spaces. Also they preferably are smooth so as to reduce frictional contact of the grain and straw and weeds.

It is to be understood that the present invention is not confined to the precise construction and arrangement of parts as herein illustrated and described but embraces all such modified forms thereof as come within the scope of the following claims.

What is claimed is:

1. In combination with the grain and straw separator housing of a harvester having a straw carrier and including means for blowing threshed material into the housing transversely of said straw carrier, a fork member including a plurality of prongs disposed substantially across the path of the incoming threshed material above said straw carrier, the said prongs being arcuate and bowed outwardly of the direction of the incoming threshed material, and the curvature of the said prongs at one side of said fork member being greater than at the opposite side.

2. In combination with the grain and straw separator housing of a harvester having a straw carrier and including means for blowing threshed material into the housing transversely of said straw carrier, a fork member including a plurality of prongs disposed substantially across the path of the incoming threshed material above said straw carrier, the said prongs being arcuate and bowed outwardly of the direction of the incoming threshed material, and the curvature of said prongs progressively increasing from one side of said fork member to the other.

3. In combination with the grain and straw separator housing of a harvester including means for blowing threshed material into the housing, a fork member including a plurality of prongs disposed substantially across the path of the incoming threshed material, the said prongs being arcuate and bowed outwardly of the direction of the incoming threshed material, the said housing including a straw outlet at one side of said fork member, and the curvature of said prongs being lesser at said outlet side than at the opposed side of the housing.

4. In combination with the grain and straw separator housing of a harvester including means for blowing threshed material into the housing, a fork member including a plurality of prongs disposed substantially across the path of the incoming threshed material, the said prongs being arcuate and bowed outwardly of the direction of the incoming threshed material, the said housing also including a straw outlet at one side of said fork member, and the curvature of said prongs progressively increasing from said outlet side toward the opposed side of said housing.

5. A grain saving device which comprises, a plurality of spaced rod-like means and means for attaching said spaced rod means to the grain and straw separator housing of a harvester so that the rod means extend transversely across the path of the incoming threshed material and substantially in the direction of the straw carrier of the harvester, the said rod means being substantially arcuate and bowed outwardly of the direction of the incoming threshed material and the curvature of the rods at one side of said spaced rod means being greater than at the other whereby to distribute straw substantially evenly over said straw carrier.

References Cited in the file of this patent
UNITED STATES PATENTS

| | | |
|---|---|---|
| 1,481,436 | Russell et al. | Jan. 22, 1924 |
| 1,621,445 | Unruh | Mar. 15, 1927 |
| 1,729,199 | Wood | Sept. 24, 1929 |
| 2,262,453 | Dray | Nov. 11, 1941 |
| 2,742,044 | McPhail | Apr. 17, 1956 |